(12) United States Patent
Zhao et al.

(10) Patent No.: US 11,411,776 B2
(45) Date of Patent: Aug. 9, 2022

(54) MULTI-CLOUD VPC ROUTING AND REGISTRATION

(71) Applicant: HUAWEI TECHNOLOGIES CO., LTD., Shenzhen (CN)

(72) Inventors: Katherine Zhao, Moutain View, CA (US); Linda Dunbar, Plano, TX (US); Feng Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 8 days.

(21) Appl. No.: 16/997,549

(22) Filed: Aug. 19, 2020

(65) Prior Publication Data
US 2020/0382345 A1 Dec. 3, 2020

Related U.S. Application Data

(63) Continuation of application No. PCT/US2019/018224, filed on Feb. 15, 2019.

(60) Provisional application No. 62/632,335, filed on Feb. 19, 2018.

(51) Int. Cl.
| | |
|---|---|
| *H04L 12/46* | (2006.01) |
| *H04L 45/50* | (2022.01) |
| *H04L 45/64* | (2022.01) |
| *H04L 45/741* | (2022.01) |
| *H04L 45/745* | (2022.01) |
| *H04L 67/10* | (2022.01) |
| *H04L 12/741* | (2013.01) |

(52) U.S. Cl.
CPC .......... *H04L 12/4679* (2013.01); *H04L 45/50* (2013.01); *H04L 45/64* (2013.01); *H04L 45/741* (2013.01); *H04L 45/745* (2013.01); *H04L 67/10* (2013.01)

(58) Field of Classification Search
None
See application file for complete search history.

(56) References Cited

U.S. PATENT DOCUMENTS 5,838,984 A  11/1998 Nguyen et al.
5,968,126 A * 10/1999 Ekstrom ............. H04L 12/4679
                                                    370/409

(Continued)

FOREIGN PATENT DOCUMENTS

| CN | 1174353 A | 2/1998 |
|---|---|---|
| CN | 106936857 A | 7/2017 |
| EP | 2928134 A2 | 7/2015 |

*Primary Examiner* — Eunsook Choi
(74) *Attorney, Agent, or Firm* — Conley Rose, P.C.

(57) ABSTRACT

A method for performing virtual private cloud (VPC) routing across multiple public cloud environments. In an embodiment, the method creates a first virtual routing agent (VRA) for a first VPC of a first public cloud. The method sends a registration request to a VRA controller, wherein the registration request comprises a data structure that includes communication parameters of the first VRA. The method receives the communication parameters of other VRAs for other VPCs located in other public cloud environments from the VRA controller. The method uses the communication parameters of the other VRAs for overlay routing of data packets from the first VPC of the first public cloud to other VPCs of other public clouds via the other VRAs of the other VPCs.

19 Claims, 7 Drawing Sheets

(56) References Cited

U.S. PATENT DOCUMENTS

| | | | |
|---|---|---|---|
| 2014/0241247 A1* | 8/2014 | Kempf | H04L 12/4641 |
| | | | 370/328 |
| 2016/0197834 A1* | 7/2016 | Luft | H04L 67/327 |
| | | | 709/223 |
| 2016/0198003 A1* | 7/2016 | Luft | H04L 67/2823 |
| | | | 709/225 |
| 2016/0308762 A1* | 10/2016 | Teng | H04L 12/4641 |
| 2016/0337175 A1* | 11/2016 | Rao | H04L 12/4633 |
| 2017/0142225 A1* | 5/2017 | Makhijani | G06F 9/45558 |
| 2020/0259792 A1* | 8/2020 | Devarajan | H04L 63/0254 |

\* cited by examiner

MULTI-CLOUD VPC ROUTING AND REGISTRATION

CROSS-REFERENCE TO RELATED APPLICATIONS

This application is a continuation of International Application No. PCT/US2019/018224 filed on Feb. 15, 2019, by Futurewei Technologies, Inc., and titled "Multi-Cloud VPC Routing and Registration," which claims the benefit of U.S. Provisional Patent Application No. 62/632,335, filed Feb. 19, 2018 by Katherine Zhao, et al., and titled "Multi-Cloud VPC Routing and Registration," each of which is hereby incorporated by reference.

TECHNICAL FIELD

Embodiments of the present disclosure relate to the field of networking, and in particular, to a method and apparatus for multi-cloud virtual private cloud (VPC) routing and registration.

BACKGROUND

The present disclosure relates generally to virtual private clouds (VPCs). A VPC is an on-demand configurable pool of shared computing resources allocated within a cloud environment, providing a certain level of isolation between the different organizations using the resources. Thus, a VPC is a logically isolated section of a cloud environment.

SUMMARY

A first aspect relates to a computer-implemented method for performing VPC routing across multiple public cloud environments. The method creates a first virtual routing agent (VRA) for a first VPC of a first public cloud. The method sends a registration request to a VRA controller, wherein the registration request comprises a data structure that includes communication parameters of the first VRA. The method receives the communication parameters of other VRAs for other VPCs located in other public cloud environments from the VRA controller. The method uses the communication parameters of the other VRAs for overlay routing of data packets from the first VPC of the first public cloud to other VPCs of other public clouds via the other VRAs of the other VPCs. Because the VRAs in each cloud has the communication parameters of the other VRAs, an overlay network can be constructed that connects VPCs in different cloud data centers. In certain embodiments, the overlay network is managed by a network operator or a cloud blocker. In certain embodiments, the complexity of public cloud infrastructure may be transparent to the customer. Advantages of the first aspect include eliminating or reducing a customer's cost, complicated configuration, and dependence on a cloud provider's virtual gateway and infrastructure services (like Elastic Compute Cloud (EC2) of Amazon Web Services (AWS)) for VPC routing.

A second aspect relates to a computer-implemented method for performing VPC routing across multiple public cloud environments. The method receives a registration request from a first VRA. The registration request comprises a data structure that includes communication parameters of the first VRA. The method registers the first VRA. The method sends the communication parameters of other VRAs to the first VRA to enable the first VRA to communicate outgoing data packets to other VRAs, wherein the other VRAs are located in a different public cloud than the first VRA. An advantage of the registration process includes increase efficiency in routing and providing visibility of communication pattern of workloads in the cloud.

In a first implementation form of the computer-implemented method according to either the first aspect or the second aspect as such, the communication parameters of the other VRAs are encapsulated into a VPC header portion of the outgoing data packets.

In a second implementation form of the computer-implemented method according to either the first aspect or the second aspect as such or any preceding implementation form of either the first aspect or the second aspect, the outgoing data packets are transmitted using Internet Protocol version 4 (IPv4) protocol, Internet Protocol version 6 (IPv6) protocol, Generic Routing Encapsulation (GRE) protocol, or Multiprotocol Label Switching (MPLS) routing.

In a third implementation form of the computer-implemented method according to either the first aspect or the second aspect as such or any preceding implementation form of either the first aspect or the second aspect, the method saves the communication parameters of other VRAs for other VPCs located in other public cloud environments in a local store.

In a fourth implementation form of the computer-implemented method according to either the first aspect or the second aspect as such or any preceding implementation form of either the first aspect or the second aspect, the method receives updated communication parameters of the other VRAs for the other VPCs located in the other public cloud environments from the VRA controller in response to a new VRA being registered with the VRA controller or to a VRA being decommissioned since a last time that the communication parameters of the other VRA were received by the first VRA.

In a fifth implementation form of the computer-implemented method according to either the first aspect or the second aspect as such or any preceding implementation form of either the first aspect or the second aspect, the method receives incoming data packets from one of the other VRAs. The method decapsulates a VPC header portion of the incoming data packets, and forwards the incoming data packets to the first VPC.

In a sixth implementation form of the computer-implemented method according to either the first aspect or the second aspect as such or any preceding implementation form of either the first aspect or the second aspect, the data structure that includes the communication parameters comprises a cloud provider identifier (ID), a VPC ID, a VPC internal Internet Protocol (IP) address structure, a service metadata structure, and a security service data structure.

In a seventh implementation form of the computer-implemented method according to either the first aspect or the second aspect as such or any preceding implementation form of either the first aspect or the second aspect, the method sends the registration request to the VRA controller during a startup process of the first VRA.

In an eighth implementation form of the computer-implemented method according to either the first aspect or the second aspect as such or any preceding implementation form of either the first aspect or the second aspect, a VPC header (VPC-HDR) is encapsulated into an IP packet between an IP layer and Transmission Control Protocol/User Datagram Protocol (TCP/UDP) layer by a VRA when the IP packet is transmitted from a first VPC to a second VPC. A destination VRA decapsulates the VPC-HDR and forwards the packet to a VPC connected to the destination VRA.

A third and fourth aspect relates to an apparatus comprising at least a processor and a memory specially configured to perform any of the preceding aspects as such or any preceding implementation form of any of the preceding aspects.

Additional details of the above aspects and other embodiments, as well as the advantages thereof, are further described in the Detailed Description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
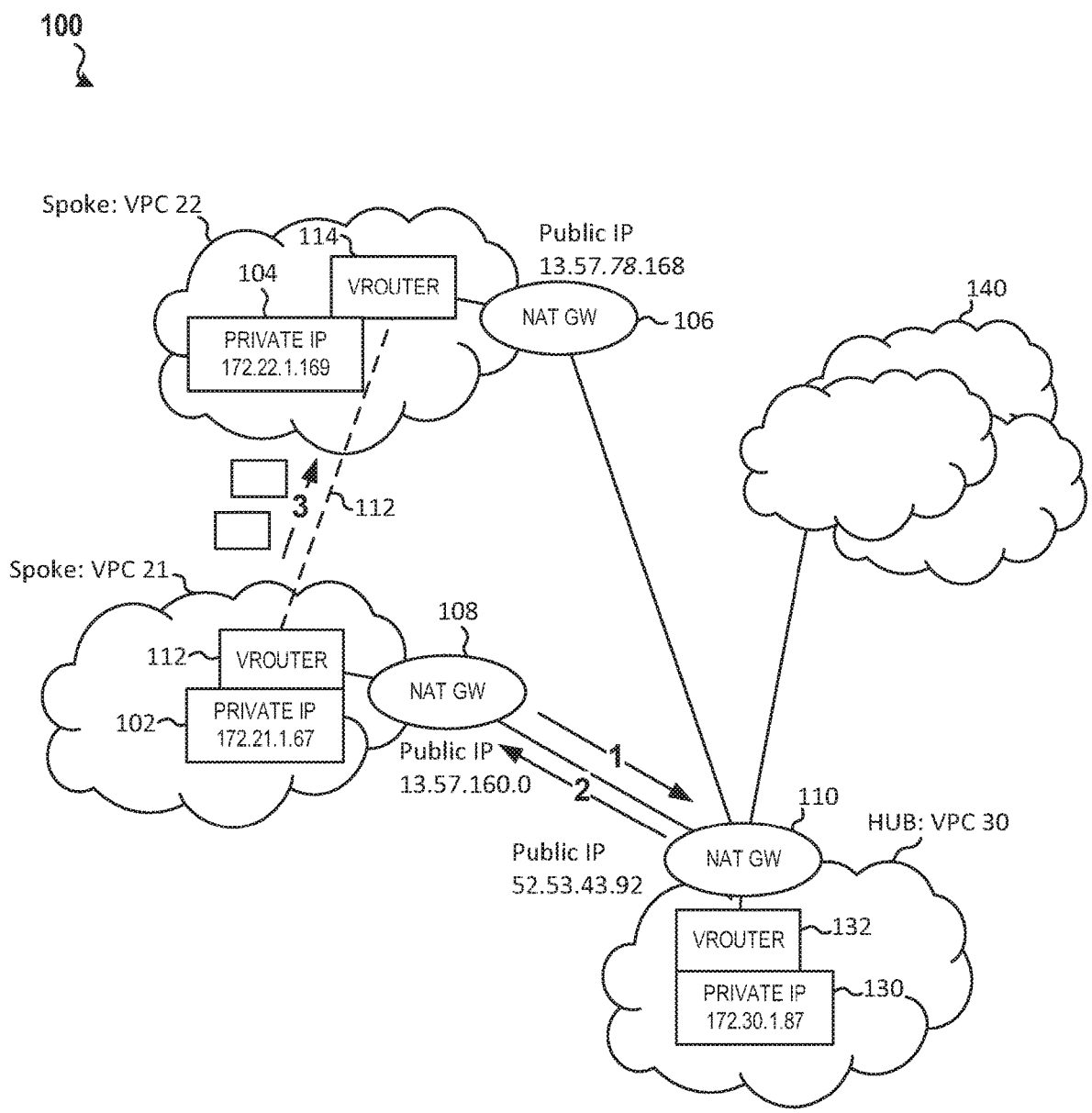
FIG. 1 is a schematic diagram illustrating VPC routing across multiple cloud networks using existing protocols in accordance with prior art.

The illustrated figures are only exemplary and are not intended to assert or imply any limitation with regard to the environment, architecture, design, or process in which different embodiments may be implemented. Any optional component or steps are indicated using dash lines in the illustrated figures.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an", and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a unit may also refer to a particular set of functions, software instructions, or circuitry that is configured to perform a specific task.

A public cloud or public cloud environment as referenced herein is a commercial cloud that provides a variety of services to the public such as network services. Non-limiting example of public clouds are AWS® provided by Amazon.com Inc., Google Cloud® provided by Alphabet Inc., Azure® provided by Microsoft Inc., and Huawei Cloud provided by Huawei Technologies Co. A private cloud refers to a model of cloud computing where network services are provisioned over a private network infrastructure for the dedicated use of a single entity or organization. A virtual private cloud (VPC) is a set of network resources and services provisioned over a public network infrastructure/public cloud for the dedicated use of a single entity or organization. VPC is a typical network service offered by a public cloud provider.

Current business practices demand a common strategy to create, connect, and operate an overlay network across multiple public clouds and private data centers (DCs). For instance, Internet of Things (IoT) traffic can travel through multiple VPCs that span across various public clouds operated by different service providers before arriving at a customer's private data center. Challenges associated with using multiple cloud service providers include cost, visibility, performance, and automation. To begin with, operators are often unprepared for large amounts of monthly or annual expenses from cloud providers, especially when they purchase more services such as VPC. In addition, there is a lack of comprehensive visibility of network assets and dependencies across the public or private cloud or premises. Regarding performance, there is no efficient performance measurement, telemetry, and machine learning (ML) that can be applied across multi-cloud and premises infrastructure. Finally, automation of network elements across multi-cloud is not available because each cloud provider has different rules and policies to follow.

One problem with current implementation is that there is no unified solution for VPC routing across different public cloud providers. VPC routing refers to when an entity or organization owns multiple VPCs in more than one public cloud, and a virtual private network (VPN) is created by stitching the VPCs together to enable routing across the VPCs, and hence across the multiple public clouds. In addition, the use of monitoring and other services from cloud providers is very costly. For instance, the existing VPC routing for a single cloud provider such as AWS provide direct connect, transit VPC, or dynamic multipoint virtual private network (DMVPN) often require complicated configuration and are costly. Additionally, customers desire to have visibility of their workloads in the cloud, and the communication pattern of their workloads and applications in hybrid clouds. However, there is a lack of an efficient routing mechanism and protocols among private network elements within VPCs across multiple public clouds and corporate private networks. Thus, automation is not possible because there is no protocol allowing a direct tunnel setup between two network elements in different VPCs belonging to different cloud providers.

For example, FIG. 1 is a schematic diagram illustrating a current implementation for VPC routing across multiple cloud networks using existing protocols in accordance with prior art. In the depicted embodiment, a partial meshed non-broadcast network 100 is created among three VPCs. Each of the VPCs includes a virtual router (vrouter). For example, in the depicted embodiment, VPC 21 has a virtual router 112, VPC 22 has a virtual router 114, and VPC 30 has a virtual router 132. In one embodiment, a virtual router is automatically created and started when a VPC is created. The virtual router connects the tiers and directs traffic among various devices of the VPC. The virtual router can also provide various services such as domain name system (DNS) and dynamic host configuration protocol (DHCP) services.

Each of the VPCs is located behind a network address translation (NAT) gateway (GW). For example, VPC 21 is located behind NAT GW 108 having a public IP address of 13.57.160.0, VPC 22 is located behind NAT GW 106 having a public IP address of 13.57.78.168, and VPC 30 is located behind NAT GW 110 having a public IP address of 52.53.43.92. A NAT GW is needed because the IP addresses assigned in the VPCs are private and cannot be used in public. The NAT GW provides the function of mapping the private IP addresses to a public address for outgoing traffic, and then mapping the public IP address to the private address for incoming traffic.

In the depicted embodiment, the network 100 is configured as a base hub-and-spoke network among VPCs, with VPC 21 and VPC 22 configured as spokes, and VPC 30 configured as a hub. Each of the VPCs may be hosted by a different cloud provider. As a non-limiting example, VPC 21 can be hosted by AWS United States (US) East cloud, VPC 22 can be hosted by AWS US-West cloud, and VPC 30 can be hosted by Huawei-Beijing cloud. VPC 30 can act as a hub for various other VPCs 140.

Currently, when a private network element (or network node) 102 in VPC 21 having an IP address of 172.21.1.67 wants to send packets to a private network node 104 having an IP address of 172.22.1.169 located in VPC 22, it sends a query (message 1), via NAT GW 108, to a private network node 130 having an IP address of 172.30.1.87 at the hub (VPC 30), via NAT GW 110, to discover the public address of NAT GW 106 where the destination VPC 22 is behind. In some embodiments, existing protocols such as multipoint generic routing encapsulation (mGRE) and next hop resolution protocol (NHRP) is used in the VPC routing problem. For example, an mGRE tunnel (or other tunneling protocol) can be created between the hub (VPC 30) and spokes (VPC 21 and VPC 22) via the NAT GW of each VPC. NHRP can be configured on the spokes (VPC 21 and VPC 22) with static VPC mapping information to register with their hub (VPC 30). In this example, the private network node 130 in the hub (VPC 30) responds (message 2) to the spoke (VPC 21) with the IP address 13.57.78.168 corresponding to the NAT GW 106. A dynamic GRE tunnel 112 is created between the two spokes VPC 21 and VPC 22. Traffic between the network node 102 having an IP address of 172.21.1.67 in VPC 21 and the network node 104 having an IP address of 172.22.1.169 located in VPC 22 traverses the dynamic GRE tunnel 112.

In the current implementation described in FIG. 1, it can be slow and inefficient for a network device within a VPC to query for the destination cloud VPC information from the hub and then set up a tunnel to the destination VPC. This configuration is very complicated for the hub and spokes. Additionally, NHRP will not work across different cloud providers. Automation is also not possible. Further, there is no overlay virtual private cloud/virtual private network (VPC/VPN) routing architecture and mechanism across multiple hybrid clouds and corporate networks. There is also a lack of a unified control plane functionality that causes forwarding inefficiency.

Accordingly, disclosed herein are several embodiments for building an overlay network that connects VPCs in different cloud DCs belonging to one customer. In one embodiment, the overlay network is managed by a network operator or a cloud blocker. In certain embodiments, the complexity of public cloud infrastructure may be transparent to the customer. In certain embodiments, a new component called a Virtual Routing Agent (VRA) is created. The VRA is configured to handle VPC routing across public clouds. In certain embodiments, the VRA may provide VPC routing, traffic steering and monitoring, as well as security services. Additionally, disclosed herein is a detailed specification for VRA registration and VRA control. In certain embodiments, VRAs are controlled and managed by a VRA controller. The disclosed embodiments eliminate the customer's dependence on the cloud provider's virtual gateway and infrastructure services (like EC2 of AWS).

Figure 2:
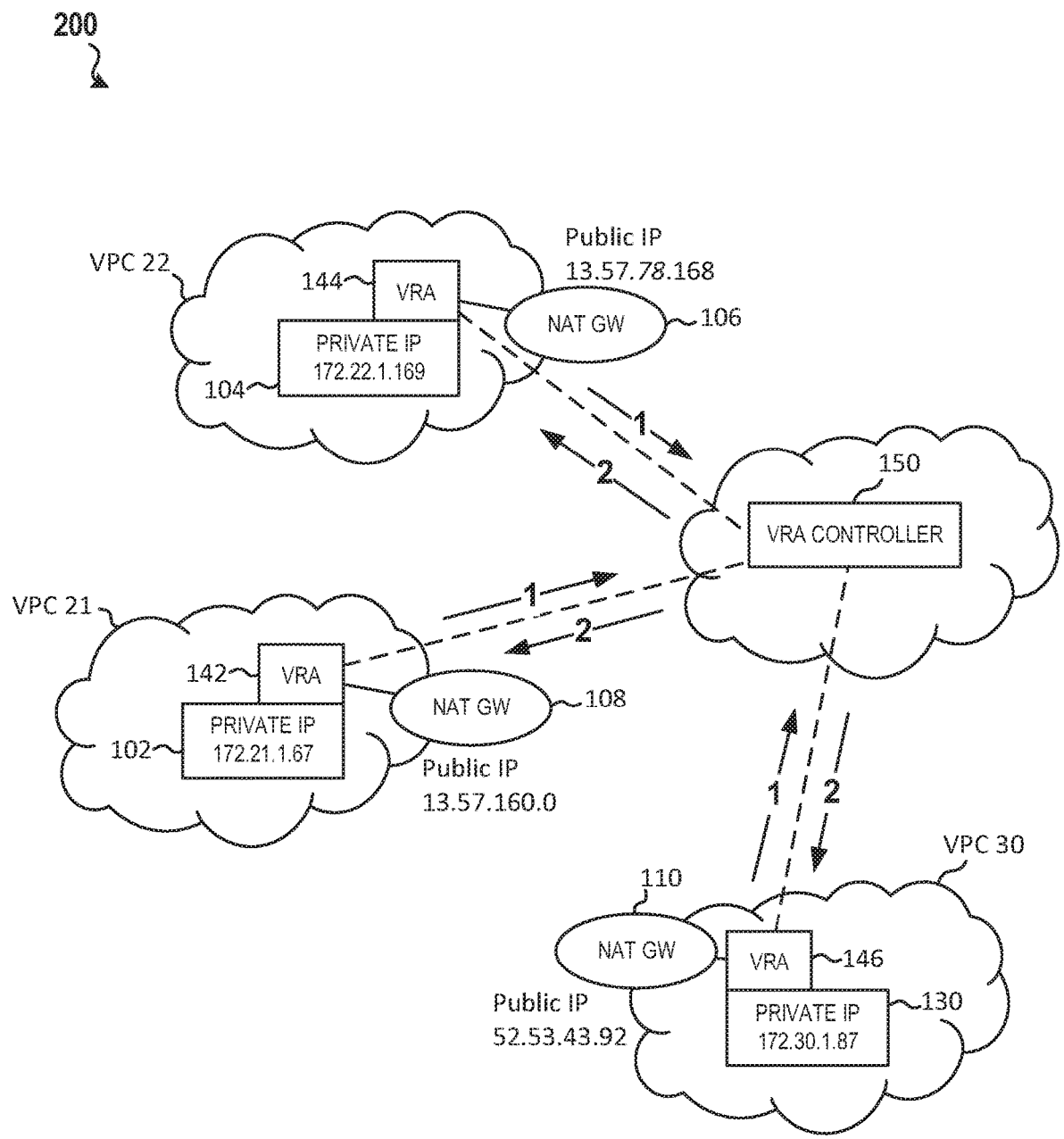
FIG. 2 is a schematic diagram illustrating an overlay VPC routing across multiple cloud networks in accordance with an embodiment of the present disclosure.

As an example, FIG. 2 is a schematic diagram illustrating an overlay VPC routing across multiple cloud networks 200 in accordance with an embodiment of the present disclosure. In the depicted embodiment, a new component called a VRA (VRA 142 in VPC 21, VRA 144 in VPC 22, and VRA 146 in VPC 30) is created to handle VPC routing across public clouds. The VRAs enable overlay routing of data packets via an overlay network between the VRAs. An overlay network is a computer network on top of another network, i.e., the underlying network. All nodes in an overlay network are connected with one another by means of logical or virtual links and each of these links correspond to a path in the underlying network.

In one embodiment, all VRAs in the overlay network may be controlled by a VRA controller 150. In certain embodiments, the VRA controller 150 may be a logically centralized software application playing a role of an application controller in the cloud as shown in FIG. 2; or the VRA controller 150 may be implemented within a virtual router of a hub in a traditional hub-and-spoke architecture as described in FIG. 1. As will be described below, in one embodiment, each of the VRAs will register with the VRA controller 150 and provide its VPC information map containing the communication settings for enabling communications between the VRAs.

Figure 3:
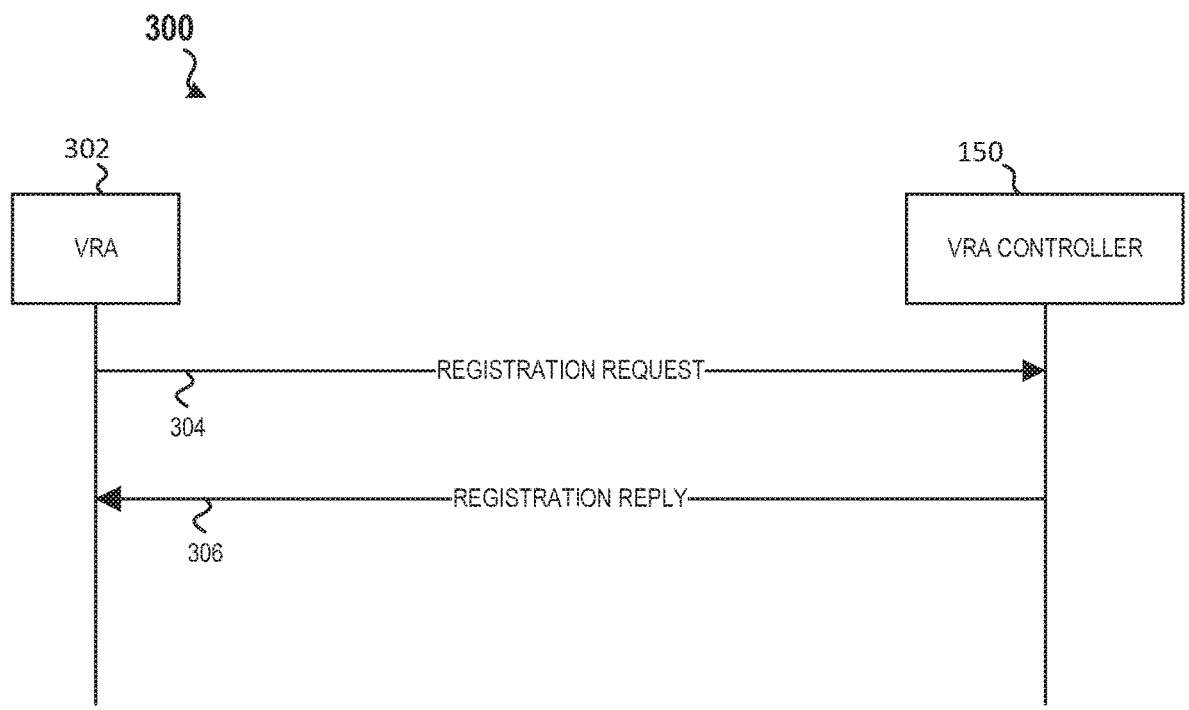
FIG. 3 is a sequence diagram illustrating a VRA registration process in accordance with an embodiment of the present disclosure.

FIG. 3 is a sequence diagram illustrating a VRA registration process 300 between a VRA 302 and the VRA controller 150 in accordance with an embodiment of the present disclosure. In one embodiment, the VRA 302 is a VRA that is implemented in a VPC, as shown in FIG. 2.

The VRA registration process 300 begins with the VRA 302 sending a registration request 304 to the VRA controller 150. In some embodiments, the VRA 302 will send out the registration request 304 upon boot up. The registration request 304 can include a VPC information map containing the communication settings for enabling communications with the VRA 302. For example, in some embodiments, a VPC in a public cloud may be described with a data structure called vpc_info_map. In some embodiments, the VRA 302 will be configured with the VPC information map and the public IP address of the VRA controller 150. In some embodiments, auto discovery of VPC information map may be performed by a router/switch and network management software.

An example of a vpc_info_map data structure that can be used in the VRA registration protocol can include a cloud provider ID (NAT public IP), a VPC ID (VRA private IP), a VPC internal IP address structure {e.g., 172.22.1.x, . . . }, and a service metadata structure {e.g., security service, monitoring service, . . . }. In an embodiment, the Cloud Provider ID is an identifier that uniquely specifies a public cloud and its zoning. The Cloud Provider ID may vary based on the implementation. As an example, in one implementation, the cloud ID can be the public IP address of the NAT gateway attached to the Internet. The VPC ID is an identifier that uniquely specifies a VPC in a public cloud. The VPC ID can also vary based on the implementation. As an example, in one implementation, the VPC ID is the private IP address of a network element at a VPC edge, where a VRA is located. In one embodiment, the VPC internal IP address structure includes all of the private IP address of the network elements (NEs) attached to the VRA within this VPC. In one embodiment, the service metadata structure includes different types of services such as, but not limited to, security service and traffic monitoring service. In one embodiment, the security service data structure is used for authentication and other access control. Non-limiting example parameters may include Key, which defines a preconfigured VRA controller key; a shared-VPC id list; and an unshared-VPC id list. Additional service structures may be further included in various embodiments.

In response to receiving the registration request 304, the VRA controller 150 transmits a registration reply message 306 to the VRA 302. In some embodiments, the VRA controller 150 is set to a listening mode. Once the registration request 304 is received from the VRA 302, the VRA controller 150 will reply to the VRA 302 with all the VPC information map of the other VRA's in the overlay private network. The VPC information map of the other VRA's in the overlay private network are obtained by the VRA controller 150 when the other VRAs are registered with the VRA controller 150. At the same time, or at a later time, the VRA controller 150 may push the VPC information map of the newly joined VRA 302 to other existing VRAs to update the VPC information map of the VRAs in the overlay network. In various embodiments, the update message can use the same message type or a different message type than that of the registration reply message 306. Once the VRA 302 obtains the VPC information map of the other VRAs in the overlay network via the registration reply message 306 and saves the VPC information map of the other VRAs to its local store, the VRA registration process 300 is completed.

The VRA registration process 300 works as a control protocol. In comparison to Locator/ID Separation Protocol (LISP), the VRA registration process 300 utilizes Software-Defined Networking (SDN) architecture and requires no data plane protocol change. Therefore, the VRA registration process 300 is considerably more simplified and has less impact to current network devices than LISP.

In various embodiments, when the VRA 302 wants to communicate with all other VRAs assigned to one customer (or tenant), the desired communication peers can be defined in a VRA group, e.g., using a data structure or parameter called Shared_VPCs. The VRA controller 150 can be configured to push down the VPC information map of the VRAs of the VRA group to the desired peer VRAs via the registration reply message 306 or using some other message type.

In some embodiments, when the group parameter (e.g., Shared_VPCs) is set to NULL, then no other VRA will receive the VPC information map of the VRA 302. In certain embodiments, when the VRA 302 is aware of the potential communication peers, the VRA 302 can indicate its known communication peers in its registration request 304 to reduce the amount of data it receives in the registration reply message 306. In certain embodiments, the registration reply message 306 will be refreshed when there are new VRAs being registered. In some embodiments, the registration reply message 306 may also be refreshed (with Time Stamp) when one or more VRAs are decommissioned (or become idle).

Figure 4:
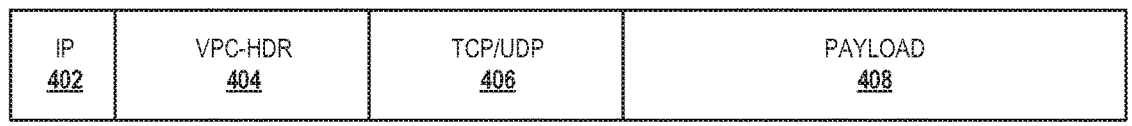
FIG. 4 is a schematic diagram illustrating a data structure that can be used for performing overlay VPC routing across multiple cloud networks in accordance with an embodiment of the present disclosure.

Regarding VRA message transport between VRAs in the overlay routing, the VRA message may be transported by many types of protocols such as, but not limited to, IPv4, IPv6, GRE, and Multiprotocol Label Switching (MPLS). As an example of a VRA message format, FIG. 4 is a schematic diagram illustrating a data structure 400 that can be used for performing overlay VPC routing across multiple cloud networks in accordance with an embodiment of the present disclosure.

In the depicted embodiment, the data structure 400 includes an IP header 402, a VPC header 404, a Transmission Control Protocol (TCP)/User Datagram Protocol (UDP) header 406, and a payload 408. In some embodiments, the IP header 402 can be an IPv4 or IPv6 header. However, the same method may be applicable to other protocols. The VPC header 404 contains the VPC routing information obtained from the VPC information map during the registration process 300 (e.g., from the vpc_info_map data structure in the registration reply message 306) for overlay routing. The TCP/UDP header 406 can be either a typical TCP header or a UDP header. TCP is a standard that defines how to establish and maintain a network conversation via which application programs can exchange data. TCP works with the Internet Protocol (IP), which defines how computers send packets of data to each other. Together, TCP and IP are the basic rules defining the Internet. UDP is an alternative communications protocol to TCP. UDP is used primarily for establishing low-latency and loss-tolerating connections between applications on the Internet. The payload 408 portion of the data structure 400 contains the actual data being sent.

Figure 5:
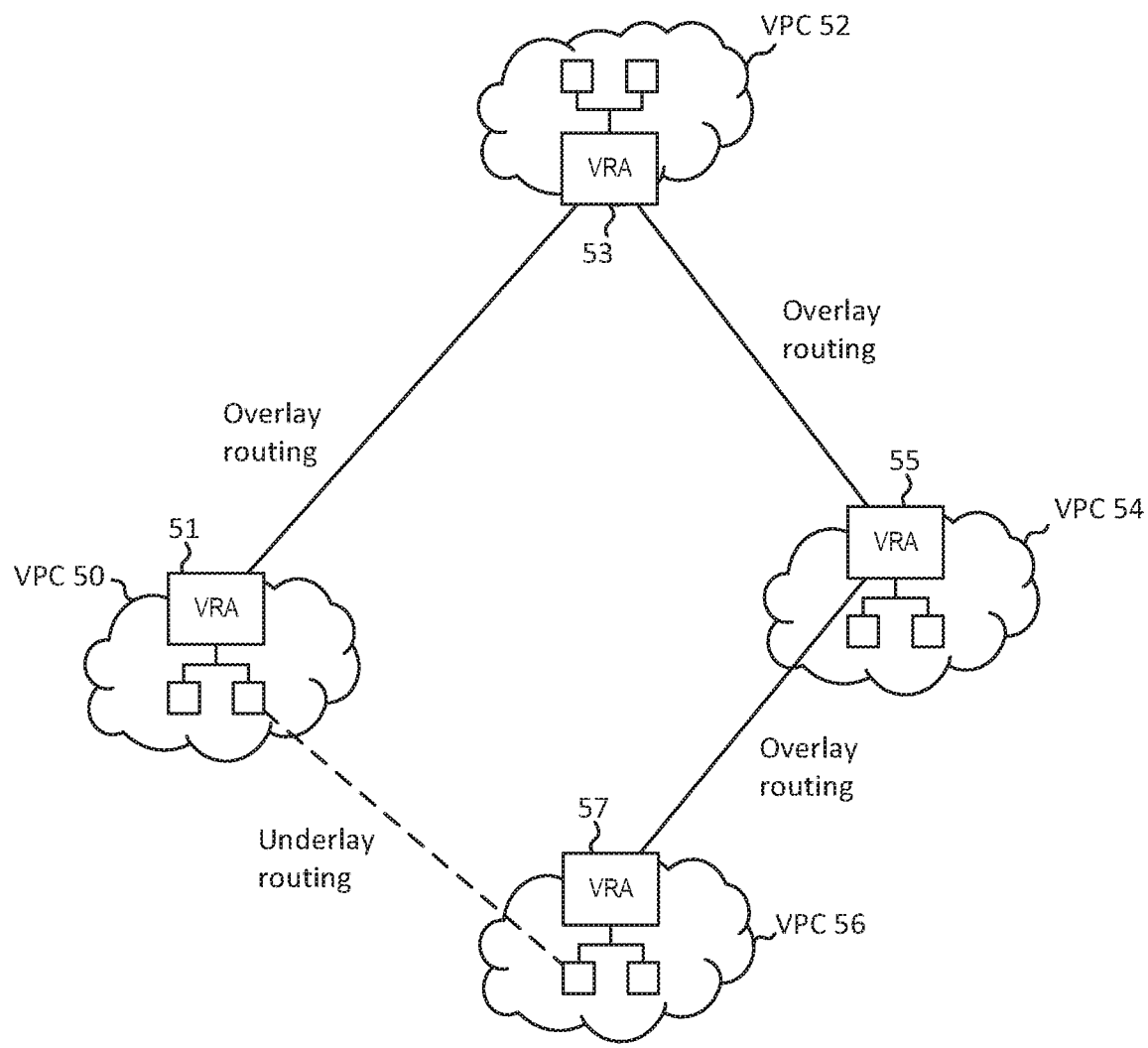
FIG. 5 is a schematic diagram illustrating routing and forwarding over stitched VPCs in accordance with an embodiment of the present disclosure.

FIG. 5 is a schematic diagram illustrating routing and forwarding over stitched VPCs in accordance with an embodiment of the present disclosure. In the depicted embodiment, each of the VPCs (VPC 50, VPC 52, VPC 54, and VPC 56) has a VRA (VRA 51, VRA 53, VRA 55, and VRA 57) created within its private cloud. The VRAs, as described herein, enable overlay routing of data packets between the VRAs. The overlay routing has no control over how data packets are routed in the underlying network between two overlay nodes, but it can control, for example, the sequence of overlay nodes a packet traverses before reaching its destination. In some embodiments, to enable overlay routing a VPC-HDR is encapsulated into IP packets (as shown in FIG. 4) at the VRA when it is transmitted from a VPC to another VPC (e.g., from VPC 50 to VPC 52). The VPC-HDR contains the communication parameters of the VRAs that the packets traverse before reaching its destination. For example, in FIG. 5, a packet from VPC 50 may travel through VPC 52 and VPC 54, before arriving at VPC 56 via their respective VRAs. In various embodiments, the overlay routing is path aware as it travels hop-by-hop across multiple VPCs connected via the VRAs. The destination VRA decapsulates the VPC-HDR of the packets and forwards the packets to VPC connected to it (VPC 56 in the given example).

Figure 6:
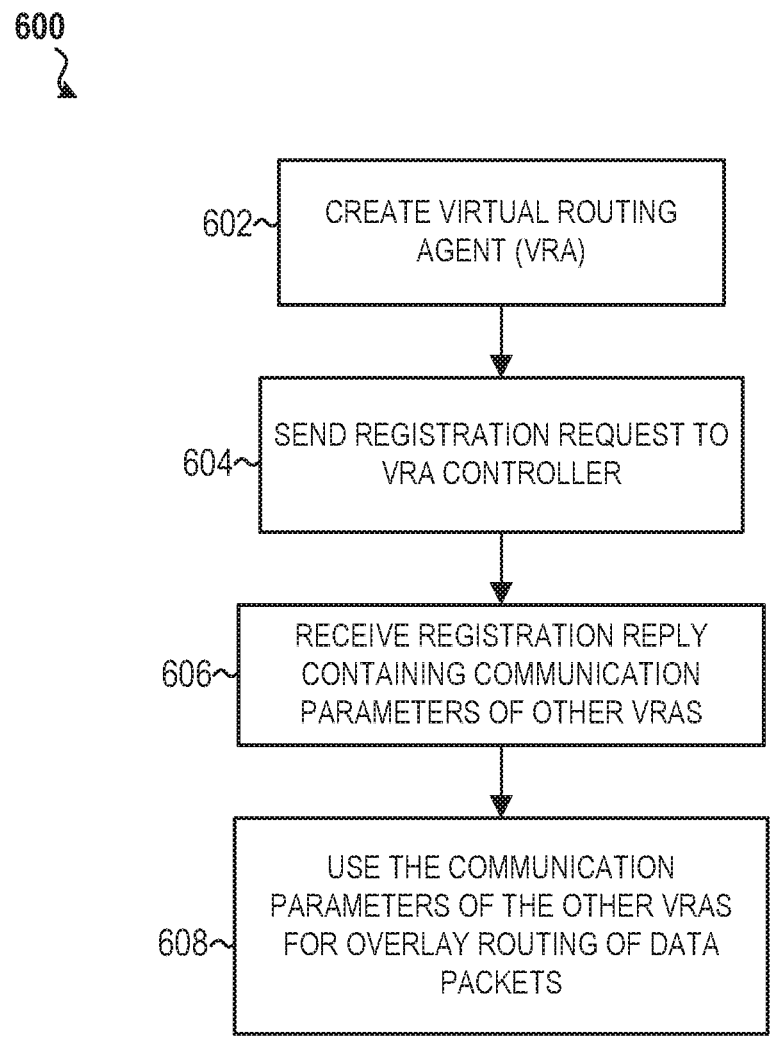
FIG. 6 is a flowchart illustrating a process performed by a VRA for enabling VPC routing across multiple public cloud environments in accordance with an embodiment of the present disclosure.

FIG. 6 is a flowchart illustrating a process 600 performed by a VRA for enabling VPC routing across multiple public cloud environments in accordance with an embodiment of the present disclosure. At step 602, the process 600 creates a VRA for a VPC of a public cloud. In some embodiments, the VRA is automatically created and started when a VPC is created. The VRA is configured to handle VPC routing across public clouds. The VRA can provide VPC routing, traffic steering and monitoring, as well as security services. In some embodiments, the VRA may be located at the edge of each VPC as well as the edge of corporate private networks. A VRA can be hosted in a virtual machine (VM) as a standard alone application, or as a component residing in a virtual router (e.g., virtual router 112 in FIG. 1) or a switch at an edge of a VPC.

At step 604, the process 600 sends a registration request to a VRA controller. In some embodiments, the registration request is sent as part of a startup or boot up process of the VRA or the machine that it is installed on. As described above, in some embodiments, the registration request can include a data structure that includes communication parameters of the VRA. For example, the data structure can include a cloud provider ID, a VPC ID, a VPC internal IP address structure, a service metadata structure, and a security service data structure.

At step 606, the process 600 receives a registration reply message from the VRA controller. The registration reply message contains the communication parameters of other VRAs located in other public cloud environments. At step 608, the process 600 uses the communication parameters of the other VRAs for overlay routing of data packets between VPCs of public clouds using the VRAs implemented in each of the VPCs. For example, in some embodiments, the communication parameters of the other VRAs are encapsulated into a VPC header portion of outgoing data packets as described in FIG. 4. The outgoing data packets may be transported using various types of protocols including, but are not limited to, IPv4, IPv6, GRE, and MPLS.

Although not illustrated in FIG. 6, the process 600 can receive updated communication parameters of other VRAs for other VPCs located in other public cloud environments from the VRA controller at various times such as, but not limited to, when a new VRA is registered with the VRA controller and/or when a VRA is decommissioned. The process 600 would update its stored VPC information map based on the updated communication parameters.

Additionally, the process 600 can receive incoming data packets from one of the other VRAs. The process 600 decapsulates a VPC header portion of the incoming data packets and forwards the incoming data packets to the VPC corresponding to the VRA indicated in the VPC header portion.

Figure 7:
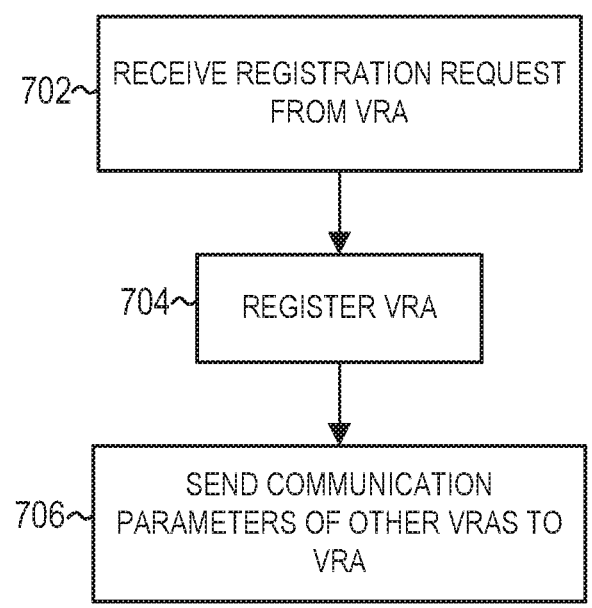
FIG. 7 is a flowchart illustrating a process performed by a VRA controller for enabling VPC routing across multiple public cloud environments in accordance with an embodiment of the present disclosure.

FIG. 7 is a flowchart illustrating a process 700 performed by a VRA controller for enabling VPC routing across multiple public cloud environments in accordance with an embodiment of the present disclosure. At step 702, the process 700 receives a registration request from a VRA. As described above, the registration request can include a data structure that contains communication parameters of the VRA. At step 704, the process 700 registers the VRA by adding the communication parameters of the VRA to the set of communication parameters for all the VRAs managed by the VRA controller. At step 706, the process 700 sends the communication parameters of other VRAs to the VRA to enable the VRA to communicate outgoing data packets to the other VRAs located in a different public cloud. In some embodiments, the process 700 may send the same set of communication parameters for all the VRAs managed by the VRA controller to all VRAs managed by the VRA controller (i.e., the set can include the communication parameters of the VRA receiving the data). Alternatively, in some embodiments, the process 700 can be configured to send only the communication parameters of the VRAs that have been indicated as being in a shared group with the registering VRA.

Figure 8:
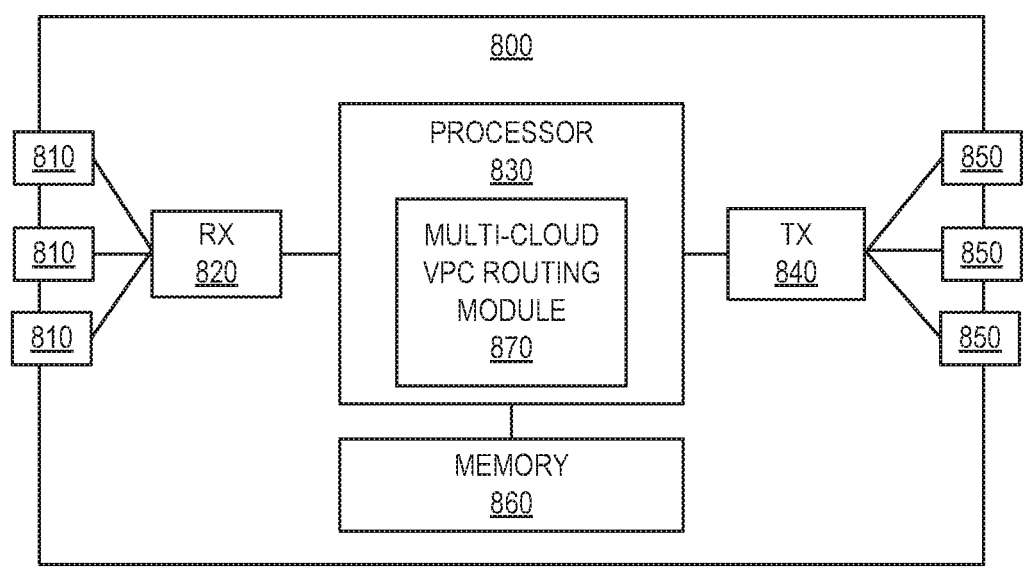
FIG. 8 is a schematic diagram illustrating an apparatus in accordance with an embodiment of the present disclosure.

FIG. 8 is a schematic diagram of a network device 800 (e.g., routing device) according to an embodiment of the disclosure. The network device 800 is suitable for implementing the disclosed embodiments as described herein. For example, the network device 800 may be a network router or an end user device. The network device 800 comprises ingress ports 810 and receiver units (Rx) 820 for receiving data; a processor, logic unit, or central processing unit (CPU) 830 to process the data; transmitter units (Tx) 840 and egress ports 850 for transmitting the data; and a memory 860 for storing the data. The network device 800 may also comprise optical-to-electrical (OE) components and electrical-to-optical (EO) components coupled to the ingress ports 810, the receiver units 820, the transmitter units 840, and the egress ports 850 for egress or ingress of optical or electrical signals.

The processor 830 is implemented by hardware and software. The processor 830 may be implemented as one or more CPU chips, cores (e.g., as a multi-core processor), field-programmable gate arrays (FPGAs), application specific integrated circuits (ASICs), and digital signal processors (DSPs). The processor 830 is in communication with the ingress ports 810, receiver units 820, transmitter units 840, egress ports 850, and memory 860. The processor 830 comprises a multi-cloud VPC routing module 870. The multi-cloud VPC routing module 870 implements the disclosed embodiments described above. For instance, the multi-cloud VPC routing module 870 can implement the routing and registration processes as described above for the various embodiments. The inclusion of the multi-cloud VPC routing module 870 therefore provides a substantial improvement to the functionality of the network device 800 and effects a transformation of the network device 800 to a different state. Alternatively, the multi-cloud VPC routing module 870 is implemented as instructions stored in the memory 860 and executed by the processor 830.

The memory 860 comprises one or more disks, tape drives, and solid-state drives and may be used as an overflow data storage device, to store programs when such programs are selected for execution, and to store instructions and data that are read during program execution. The memory 860 may be volatile and/or non-volatile and may be read-only memory (ROM), random access memory (RAM), ternary content-addressable memory (TCAM), and/or static random-access memory (SRAM).

The disclosed embodiments may be a system, an apparatus, a method, and/or a computer program product at any possible technical detail level of integration. The computer program product may include a computer readable storage medium (or media) having computer readable program instructions thereon for causing a processor to carry out aspects of the present disclosure. The computer readable storage medium may be a tangible device that can retain and store instructions for use by an instruction execution device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for performing virtual private cloud (VPC) routing across multiple public cloud environments, the method comprising:
creating a first virtual routing agent (VRA) for a first VPC of a first public cloud;
sending a registration request to a VRA controller, wherein the registration request comprises a data structure that includes communication parameters of the first VRA, and wherein the data structure comprises a cloud provider identifier (ID), a VPC ID, a VPC internal Internet Protocol (IP) address structure, a service metadata structure, and a security service data structure;
receiving communication parameters of other VRAs for other VPCs located in other public cloud environments from the VRA controller; and
using the communication parameters of the other VRAs for overlay routing of data packets from the first VPC of the first public cloud to other VPCs of other public clouds via the other VRAs of the other VPCs.

2. The method of claim 1, further comprising saving the communication parameters of other VRAs for other VPCs located in other public cloud environments in a local store.

3. The method of claim 1, further comprising receiving updated communication parameters of the other VRAs for the other VPCs located in other public cloud environments from the VRA controller in response to a new VRA being registered with the VRA controller since a last time that the communication parameters of the other VRAs were received by the first VRA.

4. The method of claim 1, further comprising receiving updated communication parameters of the other VRAs for the other VPCs located in other public cloud environments from the VRA controller in response to a VRA being decommissioned since a last time that the communication parameters of the other VRAs were received by the first VRA.

5. The method of claim 1, further comprising:
receiving incoming data packets from one of the other VRAs;
decapsulating a VPC header portion of the incoming data packets; and
forwarding the incoming data packets to the first VPC.

6. The method of claim 1, wherein the first VRA sends the registration request to the VRA controller during a startup process of the first VRA.

7. A method for performing virtual private cloud (VPC) routing across multiple public cloud environments, the method comprising:
receiving, by a virtual routing agent (VRA) controller, a registration request from a first VRA, wherein the registration request comprises a data structure that includes communication parameters of the first VRA, and wherein the data structure comprises a cloud provider identifier (ID), a VPC ID, a VPC internal Internet Protocol (IP) address structure, a service metadata structure, and a security service data structure;
registering, by the VRA controller, the first VRA; and
sending, by the VRA controller, communication parameters of other VRAs to the first VRA to enable the first VRA to communicate outgoing data packets to other VRAs, wherein the other VRAs are located in a different public cloud than the first VRA.

8. The method of claim 7, wherein the communication parameters of the other VRAs are encapsulated into a VPC header portion of the outgoing data packets.

9. The method of claim 7, wherein the outgoing data packets are transmitted using Internet Protocol version 4 (IPv4) protocol or using Internet Protocol version 6 (IPv6) protocol.

10. The method of claim 7, wherein the outgoing data packets are transmitted using Generic Routing Encapsulation (GRE) protocol.

11. The method of claim 7, wherein the outgoing data packets are transmitted using Multiprotocol Label Switching (MPLS) routing.

12. An apparatus for performing virtual private cloud (VPC) routing across multiple public cloud environments, the apparatus comprising:
a memory storing instructions; and
at least one processor coupled to the memory and configured to execute the instructions to cause the apparatus to:
create a first virtual routing agent (VRA) for a first VPC of a first public cloud;
send a registration request to a VRA controller, wherein the registration request comprises a data structure that includes communication parameters of the first VRA, and wherein the data structure comprises a cloud provider identifier (ID), a VPC ID, a VPC internal Internet Protocol (IP) address structure, a service metadata structure, and a security service data structure;
receive communication parameters of other VRAs for other VPCs located in other public cloud environments from the VRA controller; and
use the communication parameters of the other VRAs for overlay routing of data packets from the first VPC of the first public cloud to other VPCs of other public clouds via the other VRAs of the other VPCs.

13. The apparatus of claim 12, wherein the processor is configured to save the communication parameters of other VRAs for other VPCs located in other public cloud environments in a local store.

14. The apparatus of claim 12, further comprising a receiver coupled to the processor, the receiver configured to receive updated communication parameters of the other VRAs for the other VPCs located in other public cloud environments from the VRA controller in response to:
a new VRA being registered with the VRA controller since a last time that the communication parameters of the other VRAs were received by the first VRA; or a VRA being decommissioned since a last time that the communication parameters of the other VRAs were received by the first VRA.

15. An apparatus for performing virtual private cloud (VPC) routing across multiple public cloud environments, the apparatus comprising:
a memory storing instructions; and
at least one processor coupled to the memory and configured to execute the instructions to cause the apparatus to:
receive a registration request from a first virtual routing agent (VRA), wherein the registration request comprises a data structure that includes communication parameters of the first VRA, and wherein the data structure comprises a cloud provider identifier (ID), a VPC ID, a VPC internal Internet Protocol (IP) address structure, a service metadata structure, and a security service data structure; and
register the first VRA; and
a transmitter coupled to the processor, the transmitter configured to transmit communication parameters of other VRAs to the first VRA to enable the first VRA to communicate outgoing data packets to other VRAs, wherein the other VRAs are located in a different public cloud than the first VRA.

16. The apparatus of claim 15, wherein the communication parameters of the other VRAs are encapsulated into a VPC header portion of the outgoing data packets.

17. The apparatus of claim 15, wherein the outgoing data packets are transmitted using Multiprotocol Label Switching (MPLS) routing.

18. The apparatus of claim 15, wherein the outgoing data packets are transmitted using Internet Protocol version 4 (IPv4) protocol or Internet Protocol version 6 (IPv6) protocol.

19. The apparatus of claim 15, wherein the outgoing data packets are transmitted using Generic Routing Encapsulation (GRE) protocol.

* * * * *